United States Patent Office 2,753,197
Patented July 3, 1956

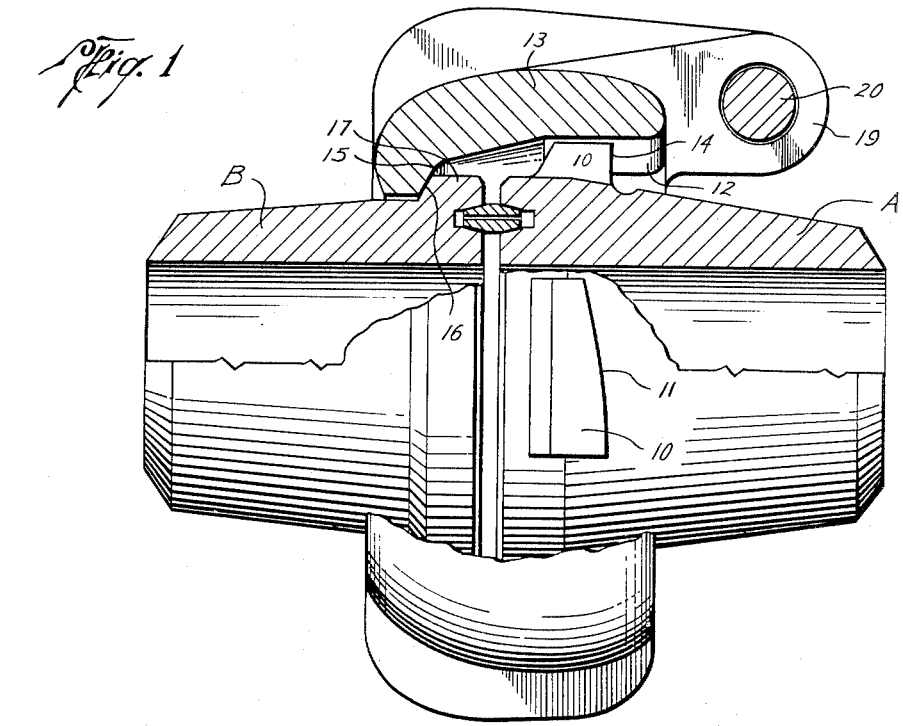
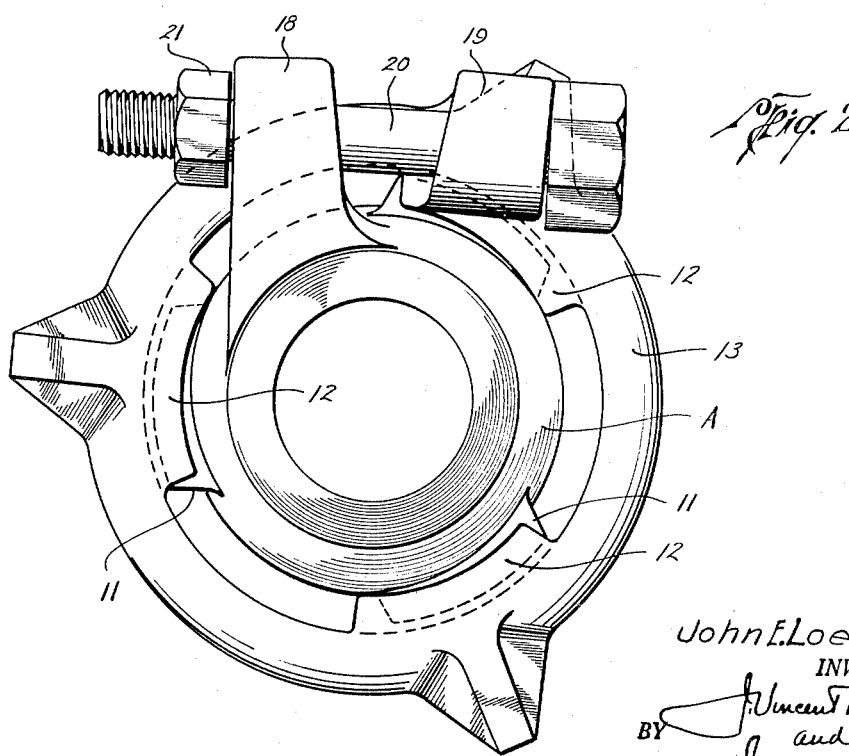

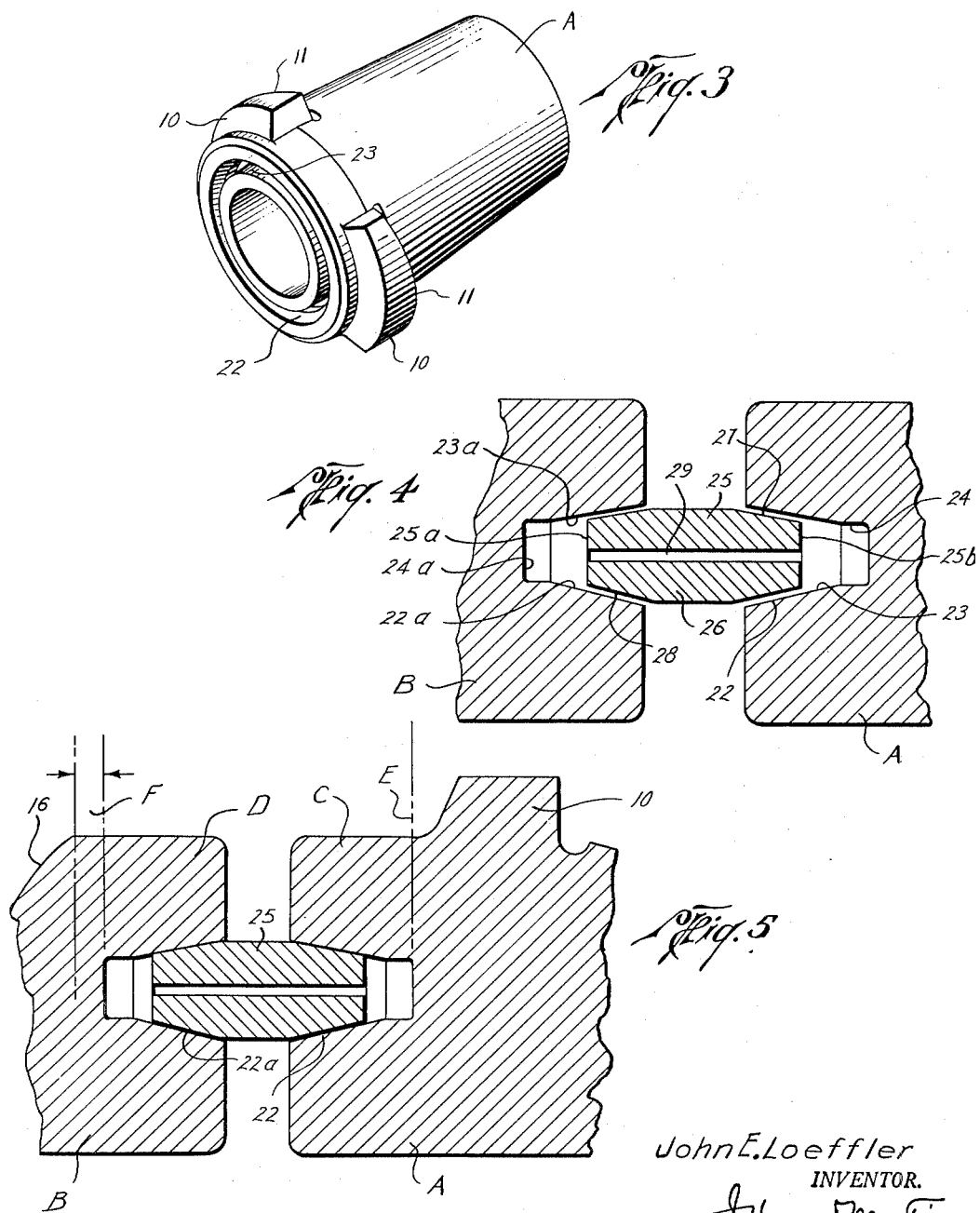

2,753,197

LUGGED PIPE COUPLINGS WITH SEAL RING GROOVES WHICH DO NOT UNDERCUT THE LUGS

John E. Loeffler, Houston, Tex., assignor to Thornhill-Craver Co., Inc., Houston, Tex., a corporation of Texas Application January 31, 1952, Serial No. 269,279

4 Claims. (Cl. 285—336)

This invention relates to new and useful improvements in couplings.

The invention is an improvement over the type of coupling shown in the patent to Laurent, No. 2,025,113.

One object of the invention is to provide an improved coupling wherein complementary grooves are formed in adjacent members to be coupled with a metallic seal ring disposed therebetween, the grooves receiving the seal ring being of a greater depth than the ring which not only allows relief for the special forming tools which form the ring but which also prevents the seal ring from touching the bottom of the grooves, whereby the residual force on the side walls of the ring is maintained and an effective seal is assured.

Another object is to provide a coupling of the character described wherein the connecting projections, flanges, shelves or the like on one of the coupling members is so disposed with respect to the ring groove that said projection is not undercut by the groove to provide for maximum strength.

Another object is to provide the members within which the sealing grooves are formed with an outer wall of uniform thickness so that temperature variations which may cause contraction and expansion of the material of which the members are constructed will not affect the seal.

A still further object is to provide a coupling wherein the seal ring which seats within the complementary grooves of the coupling member is provided with vent openings extending therethrough, which openings function to relieve any pressure which might be trapped in the bottom of the groove to thereby prevent sudden blowing out of the ring with considerable force when the coupling members are disconnected.

A still further object is to provide for connecting projections such as shelves, lugs or flanges with a spherical surface rather than a flat surface disposed at an incline whereby maximum contact between engaging surfaces of the coupling elements is obtained.

Other objects will hereinafter appear.

Figure 1 is a view partly in section and partly in elevation of a coupling constructed in accordance with the invention, Figure 2 is an end elevation of the coupling, Figure 3 is a view of the coupling member which carries the projections or shelves which cooperate with the coupling collar of the unit, Figure 4 is an enlarged sectional detail illustrating the members to be coupled being moved into position toward each other with the sealing ring entering the ring grooves, and Figure 5 is a similar view showing the sealing ring in its finally seated position.

In the drawings the letter A designates a hub member which may be welded or otherwise secured to a tubular conduit or pipe, while the letter B indicates a second hub member, hereinafter referred to as a plain hub which may also have one end connected to a tubular conduit or pipe. The hub members A and B are adapted to be coupled together to thereby couple the tubular conduits or pipe to which they are connected.

The hub member A is formed with a plurality of interrupted arcuate projections or shelves 10 which are spaced circumferentially around the member at the inner portion thereof. Each projection or shelf has a contact surface 11 which is disposed on a helical path. The projections 10 are adapted to be engaged by projections 12 which are formed within the bore of a coupling collar or ring 13, which ring is adapted to encircle the hub members A and B, as is clearly shown in Figure 1. The inner surface 14 of each projection 12 of the collar or ring is also disposed along a helical path so as to be complementary to the surfaces 11. The collar or ring 13 is provided with a spherical or arcuate surface 15 adapted to engage the arcuate or spherical surface 16 of a flange 17 formed on the plain hub member B. Since the projections 10 on the hub member A and the projections 12 on the collar or ring 13 are interrupted, as is clearly shown in Figure 2, it will be evident that the ring may be first engaged with the hub member B, after which the hub member A may be moved inwardly of the ring 13 to locate the projections 10 in a plane behind the projections 12. Upon a relative rotation of the ring 13 with respect to the hub member A, the coaction between the helical surfaces 11 and 14 of the projections 10 and 12, respectively, will pull the hub members A and B together. The cam action between the surfaces of the projections will assure the inward movement of the hub members A and B toward each other.

For effecting the rotative movement of the ring 13 with respect to the hub member A, said hub member is formed with a fixed upstanding lug 18 (Figure 2) while the ring is provided with an outwardly projecting ear 19. A headed bolt 20 passes through the ear 19 and also through the lug 18 and receives a tightening nut 21. As the nut is tightened it is apparent that the ring 13 will be rotated with respect to the hub member A so that the coaction between the projections 10 and 12 will firmly couple the hub members A and B together.

For sealing the joint between the hub members A and B, the hub member A is formed with an annular ring groove 22 which is provided with inclined side walls 23, said side walls being of equal inclination. Beyond the inclined side walls 23 the groove is formed with a relief recess 24. A similar groove 22a is formed in the abutting face of the plain hub member B and this groove has inclined side walls 23a of equal inclination and a relief recess 24a. A metallic annular sealing ring 25 is adapted to engage within the grooves 22 and 22a, and as shown in Figure 4 comprises a generally cylindrical body 26 with the side walls of the body being inclined at 27 and 28 to engage the tapered walls 23 and 23a of the grooves 22 and 22a, respectively. A plurality of ports 29 extend completely through the body of the ring and are disposed in planes parallel to the axis of the ring, each passage having its ends terminating in the circumferential end faces 25a and 25b of the ring.

The sealing ring 25 is adapted to span the joint between the hub members A and B and the tapered end portion 27 of the ring is engageable within the groove 22 of member A while the tapered end portion 28 is engageable within the groove 22a of the member B. When the coupling ring or collar 13 is rotated with respect to the members, the coaction between the projections 12 of said ring with the projections 10 of member A result in the members A and B being moved toward each other in coupling position. This forces the tapered portions 27 and 28 of the sealing ring into sealing contact with the inclined side walls 23 and 23a of the grooves 22 and 22a, the ring moving into the position shown in Figure 5. In such position a tight sealing contact between the seal ring and the grooves is produced and the circumferential end faces 25a and 25b of the ring are spaced from the bottoms of the grooves so that there is no contact between such end faces and the groove bottoms. The provision of the straight wall recesses 24 and 24a provide for this clearance between the ends of the ring and the groove bottoms when the members A and B are in fully coupled position.

From the foregoing it will be seen that the circumferential ends of the seal ring do not engage the groove bottoms, and therefore a positive seal of the ring with the inclined side walls of said grooves is assured. It might be pointed out that if the ring contacts the groove bottom, continued application of tightening pressure would result in the ring losing its residual contact force upon the side walls of the groove and the possibility of leakage would be increased. Not only do the recesses 24 and 24a at the inner extremities of the grooves provide for the desired clearance between the inner surface of the seal rings and the groove bottoms, but this also forms a relief for the special forming tools which are used in forming the grooves.

After the ring has been in position for sometime and particularly where high pressures are acting against the inner periphery of the ring, it many times occurs that pressure will find its way into the recesses 24 and 24a behind the seal ring. Subsequently, when the coupling is disconnected and the members separated the ring may be retained in the groove of one of the members because of the frictional engagement. As soon as separation of the members occurs any pressure which might have been trapped between the end face of the seal ring and the bottom of the groove will be relieved through the relief passages 29, and this eliminates any possible danger of this trapped pressure forceably ejecting the ring from the groove to thereby obviate the possibility of injury by such ejection. The provision of the relief passage is actually a safety feature of the device.

Because the coupling may be subjected to expansion and contraction due to varying temperature conditions, it is desirable that the peripheral area which encircles each groove in the members A and B be of a constant uniform thickness, and as is clearly shown in Figure 5, such arrangement is provided in the present coupling. The area generally indicated at C, which is the peripheral portion of the member A beyond the groove 22, is of a constant thickness, while the area indicated at D, which is the peripheral portion of the member B surrounding the groove 22a, is also of a constant thickness. The projections or shelves 10 on the member A which function in the coupling operation are disposed inwardly of the plane E in which the bottom of the groove 22 lies, whereby said groove does not undercut the projections or shelves, and therefore does not weaken the structure. Similarly, the spherical surface 16 of the member B which coacts with the coupling ring 13 is spaced inwardly by the distance indicated at F in Figure 5 from the plane in which the bottom of the groove 22a in said member lies. Therefore this surface 16 is not undercut by the groove 22a to provide maximum strength in the part.

The device is of the quick coupling type because the projections 10 of member A and the projections 12 of the coupling ring 13 may be quickly interengaged after which the parts are rotated to couple the members. The seal ring and its receiving grooves have the inclined sides which assure tight sealing engagement between the parts while the relief recesses at the bottoms of the groove prevent engagement of the end faces of the seal ring with the groove bottoms to assure that the residual force within the seal ring which makes the seal is always maintained. The provision of the relief ports in the seal ring is a safety feature which relieves any pressure which might be trapped behind the ring. The relationship of each groove to the surface or projection which coacts with the coupling ring or element is such that maximum strength in the members A and B is obtained.

The foregoing disclosure and description of the invention is illustrative and explanatory thereof and various changes in the size, shape and materials, as well as in the detail of the illustrated construction may be made, within the scope of the appended claims, without departing from the spirit of the invention.

Having described the invention, I claim:

1. A coupling including, a plain hub member having an annular seal ring groove in its end face, an external flange on said hub member forming an annular shoulder thereon which shoulder is disposed outwardly from the end face of the member by a distance greater than the depth of the groove, a second hub member adapted to be axially aligned with the plain hub member and having a seal ring groove in its end face which abuts the end face of the plain hub member, the peripheral area which encircles each groove in each of said hub members being of a constant uniform thickness, a plurality of arcuate coupling projections on the exterior of the second hub member and disposed inwardly of the end face thereof by a distance greater than the depth of the groove, an annular coupling element encircling the end portions of the aligned hub members having means engaging the annular shoulder on the plain hub member and also having arcuate projections engaging the arcuate projections on said second hub member for securing the members together, and an annular seal ring spanning the joint between the members and engageable within seal ring grooves in the end faces of said members.

2. A coupling as set forth in claim 1, wherein the contacting surfaces of the arcuate projections on the coupling element and the arcuate projections on the second hub member are disposed along a helical path about the hub member, whereby rotation of the coupling element relative to said hub member imparts axial movement to the hub member.

3. A coupling member as set forth in claim 1, wherein each groove in cross-section has inclined side walls with each side wall being of the same inclination, a straight wall recess extending from the side walls to the bottom of the groove and having its center aligned with the center of the groove and forming a continuation of said groove, said seal ring being formed with inclined sealing surfaces engageable with the inclined side walls of the grooves when the members are in fully coupled position, the circumferential ends of the seal ring being spaced from the bottoms of said grooves to provide a clearance therebetween when said hub members are fully coupled and sealing is effected.

4. A coupling member as set forth in claim 1, wherein each groove in cross-section has inclined side walls with each side wall being of the same inclination, a straight wall recess extending from the side walls to the bottom of the groove and having its center aligned with the center of the groove and forming a continuation of said groove, said seal ring being formed with inclined sealing surfaces engageable with the inclined side walls of the grooves when the members are in fully coupled position, the circumferential ends of the seal ring being spaced from the bottoms of said grooves to provide a clearance therebetween when said hub members are fully coupled and sealing is effected, said seal ring having a relief passage extending therethrough from end to end thereof and disposed in a plane parallel to the axis of the seal ring.

References Cited in the file of this patent

UNITED STATES PATENTS

| 1,567,813 | Oleson | Dec. 29, 1925 |
| 1,583,126 | Crane | May 4, 1926 |
| 2,025,113 | Laurent | Dec. 24, 1935 |
| 2,417,025 | Volpin | Mar. 4, 1947 |